(12) United States Patent
Klusacek

(10) Patent No.: US 9,932,904 B2
(45) Date of Patent: Apr. 3, 2018

(54) EXHAUST GAS TURBOCHARGER

(71) Applicant: Bosch Mahle Turbo Systems GmbH & Co. KG, Stuttgart (DE)

(72) Inventor: Michal Klusacek, Praha (CZ)

(73) Assignee: Bosch MahleTurbo Systems GmbH & Co. KG (DE)

( * ) Notice: Subject to any disclaimer, the term of this patent is extended or adjusted under 35 U.S.C. 154(b) by 424 days.

(21) Appl. No.: 14/675,707

(22) Filed: Mar. 31, 2015

(65) Prior Publication Data

US 2015/0275765 A1 Oct. 1, 2015

(30) Foreign Application Priority Data

Apr. 1, 2014 (DE) .......... 10 2014 206 162

(51) Int. Cl.
F01D 25/16 (2006.01)
F01D 25/24 (2006.01)
F02C 6/12 (2006.01)
F02C 7/24 (2006.01)

(52) U.S. Cl.
CPC .............. F02C 7/24 (2013.01); F01D 25/16 (2013.01); F01D 25/246 (2013.01); F02C 6/12 (2013.01); F05D 2220/40 (2013.01); F05D 2230/642 (2013.01); F05D 2260/231 (2013.01); F05D 2260/30 (2013.01); F05D 2300/5024 (2013.01)

(58) Field of Classification Search
CPC ........ F01D 25/243; F01D 25/246; F02C 6/12; F02C 7/24; F05D 2220/40; F05D 2230/642; F05D 2260/30; F05D 2260/231; F05D 2300/5024
See application file for complete search history.

(56) References Cited

U.S. PATENT DOCUMENTS

| 4,480,956 | A | * | 11/1984 | Kruger | ............. F01D 5/14 415/173.4 |
| 4,756,673 | A | * | 7/1988 | Miyashita | ............. F01D 25/14 417/400 |
| 5,116,158 | A | | 5/1992 | Carruthers et al. | |
| 8,267,647 | B2 | * | 9/2012 | Scholz | ............. F01D 9/041 415/209.2 |
| 2015/0110600 | A1 | * | 4/2015 | MacK | ............. F01D 11/003 415/111 |

(Continued)

FOREIGN PATENT DOCUMENTS

| CN | 203395507 U | 1/2014 |
| DE | 2948398 A1 | 6/1981 |
| DE | 20009004 U1 | 8/2000 |

(Continued)

OTHER PUBLICATIONS

English abstract for DE102008000849.

(Continued)

Primary Examiner — Jason Shanske
Assistant Examiner — Christopher R Legendre
(74) Attorney, Agent, or Firm — Fishman Stewart PLLC

(57) ABSTRACT

An exhaust gas turbocharger may include a compressor housing and a turbine housing. The turbine housing may be connected to the compressor housing via a plurality of spacer pins composed of a heat-insulating material. The plurality of spacer pins may respectively include a head and at least one axial pin.

20 Claims, 3 Drawing Sheets

(56) References Cited

U.S. PATENT DOCUMENTS

2015/0275765 A1* 10/2015 Klusacek ................ F02C 6/12
60/605.1

FOREIGN PATENT DOCUMENTS

| DE | 102008000849 A1 | 10/2009 | | |
|---|---|---|---|---|
| DE | 102008048126 A1 | 3/2010 | | |
| FR | 2970740 A1 * | 7/2012 | ............... | F02C 6/12 |
| GB | 563918 A | 9/1944 | | |
| GB | 2064656 A | 6/1981 | | |
| WO | WO-2013/180959 A1 | 12/2013 | | |

OTHER PUBLICATIONS

English abstract for DE102008048126.
English abstract for CN 203395507U.
Chinese Office Action for 201510106860.8 dated Jun. 2, 2017.

* cited by examiner

EXHAUST GAS TURBOCHARGER

CROSS-REFERENCE TO RELATED APPLICATIONS

This application claims priority to German Patent Application No. 10 2014 206 162.8, filed Apr. 1, 2014, the contents of which are hereby incorporated by reference in their entirety.

TECHNICAL FIELD

The present invention relates to an exhaust gas turbocharger with a compressor housing and a turbine housing.

BACKGROUND

From DE 10 2008 048 126 A1 a generic exhaust gas turbocharger with a compressor housing and a turbine housing is known, wherein the bearings of a rotor are seated in the turbine housing and in the compressor housing, since these are directly attached to one another, without the bearing housing that is usually arranged between turbine housing and compressor housing. The turbine housing in this case is connected to the turbine housing via a spacer ring, wherein the spacer ring is to serve as bearing ring for a variable turbine geometry at the same time. Radially outside the spacer ring, the turbine housing is also directly connected to the compressor housing, as a result of which heat transfer can occur here.

From DE 200 09 004 U1 a further exhaust gas turbocharger with a gas turbine connected to the exhaust side of an internal combustion engine is known, wherein a turbine housing and a compressor housing are directly connected to one another to form a housing. Heat insulation between these two housings is not provided.

With usual exhaust gas turbochargers, a bearing housing for mounting a rotor is located between the turbine housing and the compressor housing, which is why direct heat transfer between the turbine housing to the compressor housing and accompanied by this, heat expansion problems usually do not occur. With exhaust gas turbochargers, the rotors of which however are mounted in the turbine housing and in the compressor housing and with which no bearing housing is provided between these two housings, an undesirable heat transfer can occur which under certain conditions can result in an impairment of the function of the exhaust gas turbocharger.

SUMMARY

The present invention therefore deals with the problem of stating an improved or at least an alternative embodiment for an exhaust gas turbocharger of the generic type, which in particular does not have the disadvantages known from the prior art.

According to the invention, this problem is solved through the subject of the independent claims. Advantageous embodiments are subject of the dependent claims.

The present invention is based on the general idea from connecting, in the case of an exhaust gas turbocharger without bearing housing, a turbine housing to a compressor housing via at least three heat-insulating spacer pins. The at least three spacer pins in this case have a comparatively low heat conductivity coefficient, as a result of which heat transfer between the comparatively hot turbine housing and the compressor housing can be greatly reduced. This is of elementary significance in particular for such exhaust gas turbochargers in which the turbine housing is arranged on the compressor housing without intermediate connection of a bearing housing.

Practically, the spacer pins are formed from ceramic, in particular from zirconium oxide. Such spacer pins formed from ceramic cannot only be produced in a cost-effective manner but also have a very low heat transfer rate, i.e. a low heat conductivity coefficient, as a result of which in particular the heat transfer between the turbine housing and the compressor housing can be at least greatly reduced. In particular zirconium oxide has a high resistance to chemical, thermal and mechanical influences, just like obviously further ceramics as well, as a result of which the use in the above described manner is particularly advantageous.

Practically, recesses for receiving the spacer pins are provided in the turbine housing and/or in the compressor housing. By way of such recesses it is possible to not only assign the spacer pins a heat-insulating function but also a centering function at the same time, which significantly simplifies the assembly of the exhaust gas turbocharger. The recesses in this case can be optionally formed in the manner of elongated holes in order to be able for example to compensate for heat expansion of the turbine housing, or alternatively as fitted bores, as a result of which reliable fixing for example is made possible. In this case, the spacer pins usually have a rotation-symmetrical shape. Alternatively, an angular shape is obviously also conceivable, wherein in this case the recesses have to be formed accordingly. Through the elongated hole-like design of the recesses, which advantageously run in radial direction, simple compensation for possible temperature expansions of the turbine housing is possible.

In an advantageous further development of the solution according to the invention, the turbine housing is screwed to the compressor housing. Such a screw connection makes possible both a comparatively simple and secure assembly as well as a comparatively simple disassembly of the two housing parts, which is of major advantage in particular in the case of maintenance operations.

Further important features and advantages of the invention are obtained from the subclaims, from the drawings and from the associated figure description with the help of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

It shows, in each case schematically

DETAILED DESCRIPTION

Figure 1:
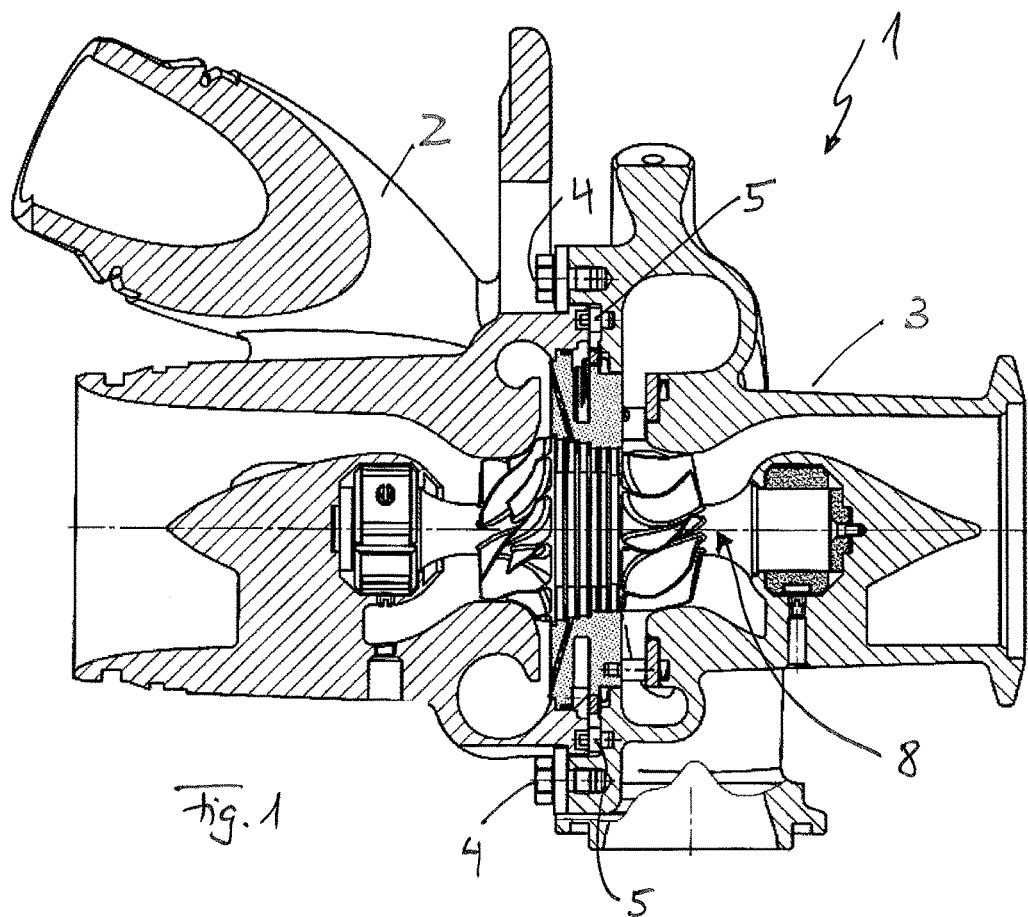
FIG. 1 a sectional representation through an exhaust gas turbocharger according to the invention, FIG. 2 a partially sectioned view through the exhaust gas turbocharger, FIG. 3 different embodiments of a spacer pin, FIG. 4 a view of a turbine housing, FIG. 5 a view of a compressor housing with elongated hole-like recesses, FIG. 6 a representation as in FIG. 5, however with other recesses, FIG. 7 a possible embodiment of the exhaust gas turbocharger according to the invention with a spacer pin according to FIG. 3b.
Figure 2:
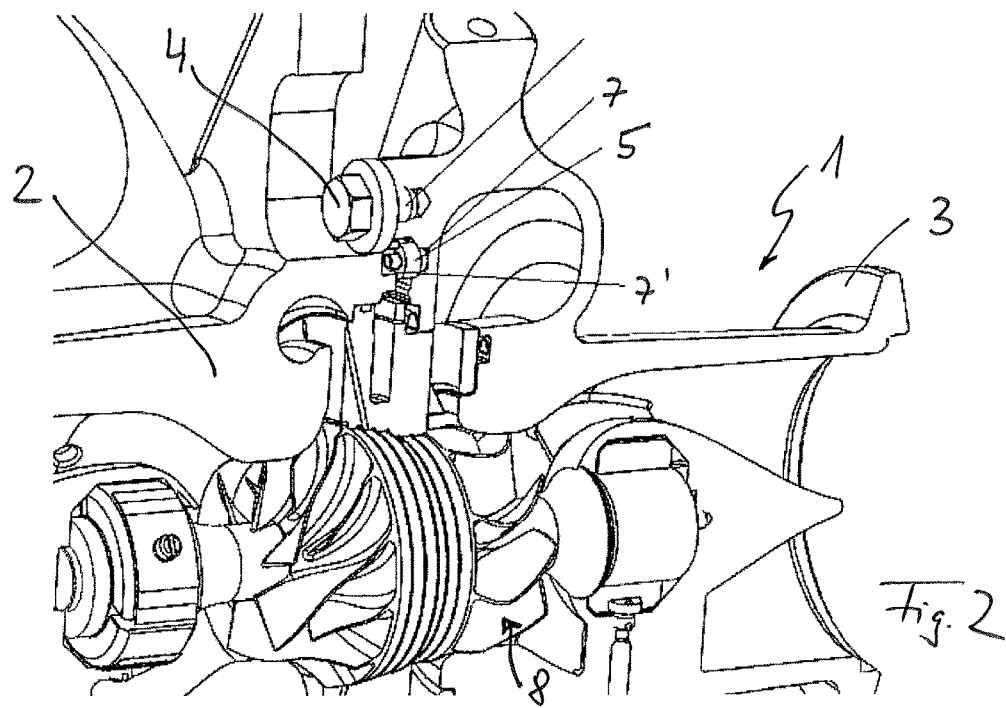
Figure 7:
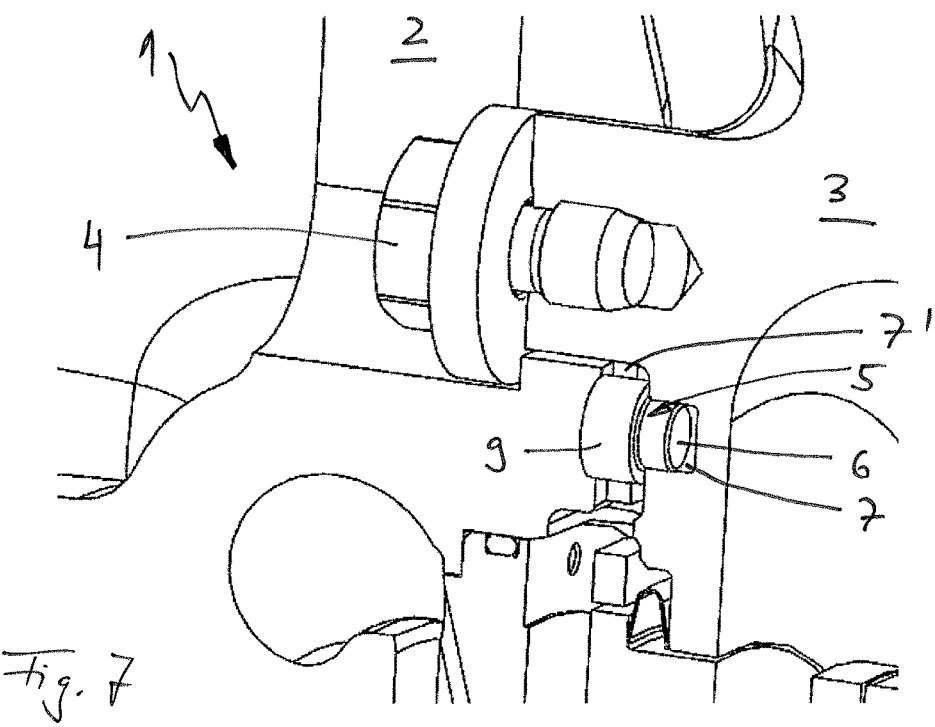

According to FIGS. 1, 2 and 7, an exhaust gas turbocharger 1 according to the invention comprises a compressor housing 2 and a turbine housing 3. The compressor housing 2 in this case is screwed to the turbine housing 3 via screws 4. According to the invention, the turbine housing 3 is now connected to the compressor housing 2 via at least three heat-insulating spacer pins 5. Obviously, four or more spacer pins 5 can also be provided here. According to the invention, these are formed of a heat-insulating material, for example from ceramic, in particular from zirconium oxide, as a result of which a heat transfer between the comparatively hot turbine housing 3 and the compressor housing 2 is to be at least minimised. For in the shown embodiment of the exhaust gas turbocharger 1 according to the invention, a bearing housing which is usually arranged between the compressor housing 2 and the turbine housing 3 is omitted, so that the two housing parts 2, 3 are directly connected to one another. In order to be able to at least reduce an undesirably high heat transfer between the turbine housing 3 and the compressor housing 2, the at least three heat-insulating spacer pins 5 are provided.

Figure 3:
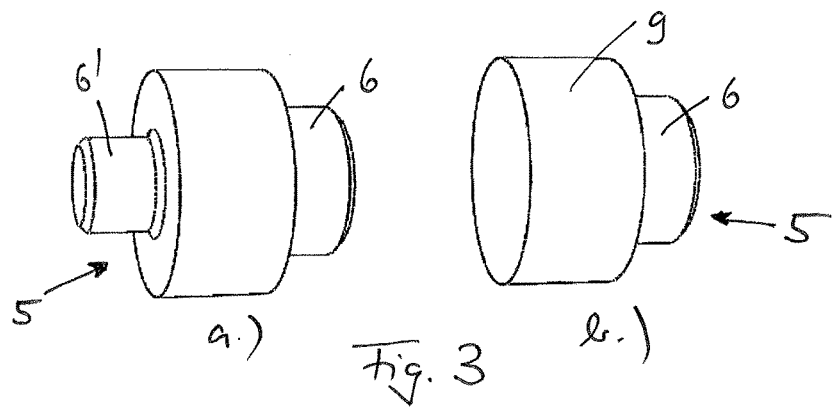
Figure 4:
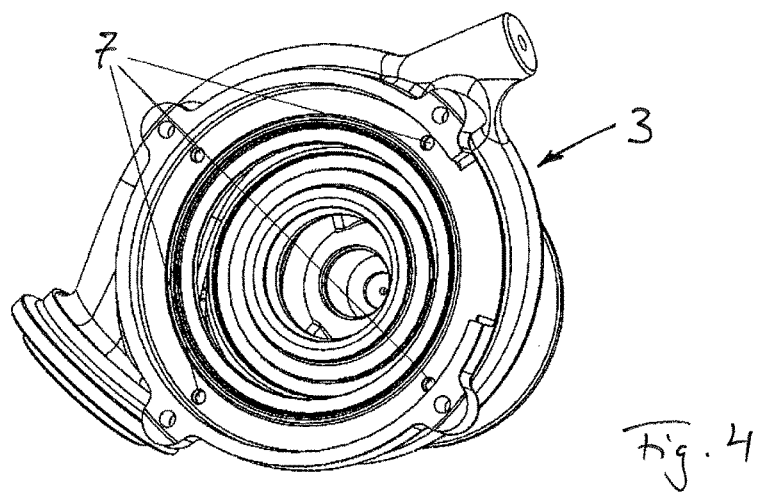

Looking at the spacer pins 5 according to the FIGS. 3a and 3b, it is evident that these have a rotation-symmetrical shape, wherein it is obviously also conceivable that these have an angular shape. The spacer pin 5 shown according to FIG. 3a has two axial pins 6, 6', whereas the spacer pin 5 shown according to FIG. 3 merely has one such axial pin 6. With the axial pin 6 the spacer pin 5 is able to engage in an associated recess 7 on the turbine housing 3. The recesses 7 (see FIG. 4) in this case are likewise formed rotation-symmetrically, in particular even as a fitted bore, as a result of which the spacer pin 5 can be received therein fixed in position.

Figure 5:
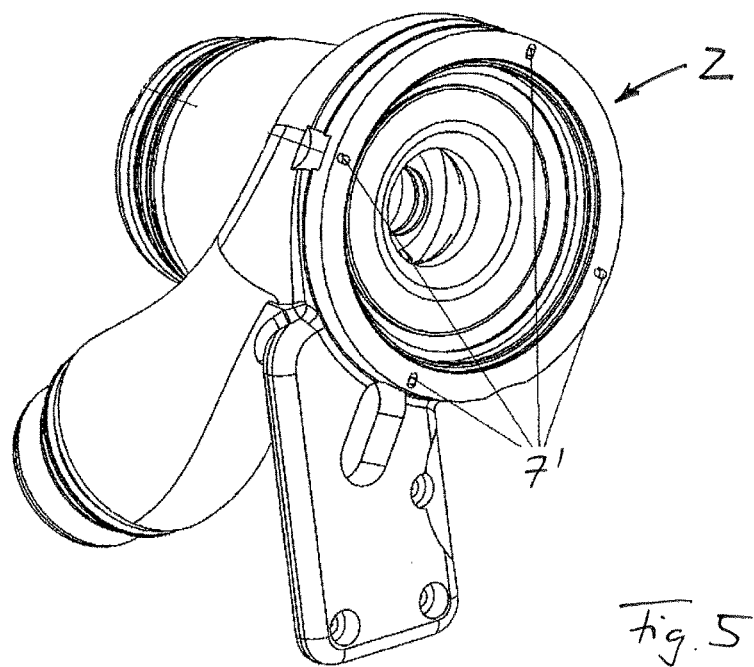
Figure 6:
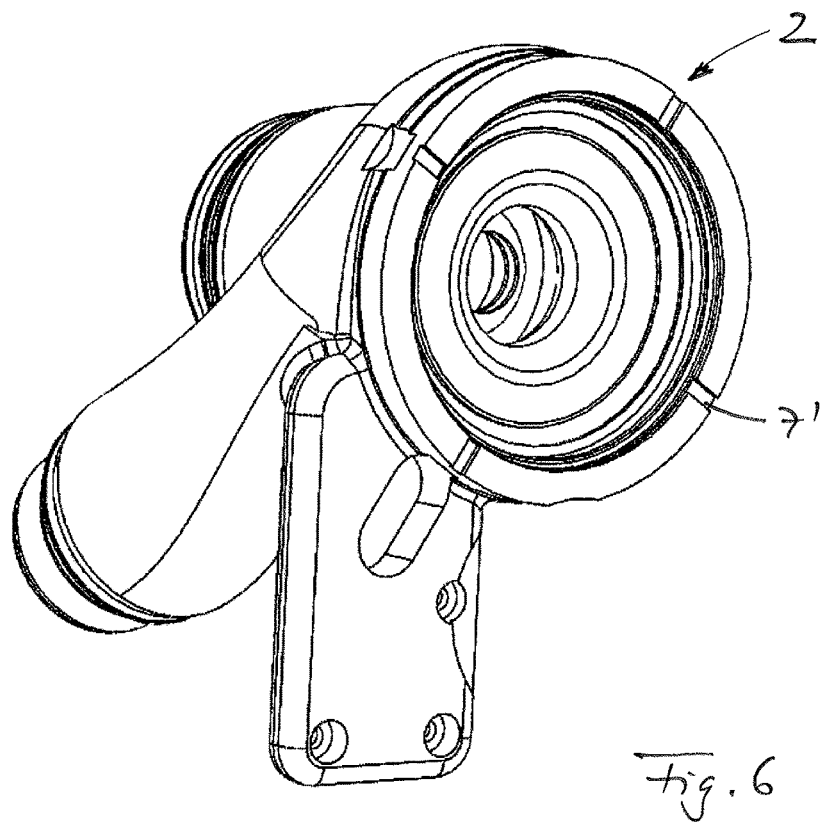

In the same way, the recesses 7' on the compressor housing 2 can also be formed, wherein it is also conceivable alternatively that these are formed elongated hole-like, as is shown according to the FIGS. 5 and 6. If the spacer pin 5 is formed as shown in FIG. 3a, it is able to engage both in the recesses 7 of the turbine housing 3 and also in the associated recesses 7' of the compressor housing 2 and because of this assume a centering function between the two housings 2, 3. Because of the elongated hole-like design of the recesses 7' a heat expansion of the turbine housing 3 during the operation of the exhaust gas turbocharger 1 can also be easily compensated for.

In the embodiment of the spacer pin 5 shown according to FIG. 3b it is possible to let said spacer pin 5 engage in recesses 7' of the compressor housing 2, as is shown according to the FIGS. 6 and 7, wherein purely theoretically it is also conceivable that a spacer pin 5 designed in this manner does not assume any centering function so that this has to be assumed by other elements. Here, the recesses 7' according to FIG. 6 are embodied as radial slots, in which the spacer pin 5 with its head 9 at least partially engages. By way of its axial pin 6, the spacer pin 5 engages in the recess 7 on the turbine housing 3, as a result of which in turn an arrangement of the turbine housing 3 and compressor housing 2 compensating for temperature differences is made possible.

With the spacer pins 5 formed according to the invention it is possible to at least reduce an undesirable heat transfer between the turbine housing 3 and the compressor housing 2, in particular in the case of exhaust gas turbochargers 1, in which the turbine housing 3 and the compressor housing 2 are connected to one another without the intermediate connection of a bearing housing. A rotor 8 in this case is mounted in the turbine housing 3 and in the compressor housing 2.

The invention claimed is:

1. An exhaust gas turbocharger, comprising:
a compressor housing and a turbine housing, the turbine housing being connected to the compressor housing via a plurality of spacer pins composed of a heat-insulating material, the plurality of spacer pins respectively including a head and at least one axial pin; and
wherein the head of at least one spacer pin axially separates the turbine housing from the compressor housing.

2. The exhaust gas turbocharger according to claim 1, wherein the plurality of spacer pins are composed of a ceramic.

3. The exhaust gas turbocharger according to claim 1, wherein at least one of the turbine housing and the compressor housing includes a plurality of recesses receiving the plurality of spacer pins.

4. The exhaust gas turbocharger according to claim 3, wherein the plurality of recesses in the at least one of the turbine housing and the compressor housing define a shape of an elongated hole to compensate for a heat expansion of the at least one of the turbine housing and the compressor housing.

5. The exhaust gas turbocharger according to claim 3, wherein the plurality of recesses in the at least one of the turbine housing and the compressor housing respectively define a fitted bore.

6. The exhaust gas turbocharger according to claim 3, wherein:
the at least one spacer pin engages at least one recess disposed in the turbine housing and the compressor housing, the at least one spacer pin disposed between the turbine housing and the compressor housing and configured to position the turbine housing with the compressor housing; and
another of the plurality of spacer pins only engages one of the plurality of recesses in one of the turbine housing and the compressor housing.

7. The exhaust gas turbocharger according to claim 3, wherein the plurality of spacer pins have at least one of a rotation-symmetrical shape and an angular shape, wherein the plurality of recesses include a profile complementary to the plurality of spacer pins.

8. The exhaust gas turbocharger according to claim 1, wherein the turbine housing is fastened to the compressor housing.

9. The exhaust gas turbocharger according to claim 1, wherein the plurality of spacer pins includes at least three spacer pins.

10. The exhaust gas turbocharger according to claim 1, wherein the plurality of spacer pins are composed of a zirconium oxide.

11. The exhaust gas turbocharger according to claim 1, further comprising a plurality of recesses disposed on at least one of an axial mating face of the turbine housing and an axial mating face of the compressor housing, wherein the at least one axial pin of the plurality of spacer pins respectively engages into at least one of the plurality of recesses.

12. The exhaust gas turbocharger according to claim 11, wherein the head of the plurality of spacer pins respectively defines a diameter greater than a diameter of the plurality of respective recesses.

13. The exhaust gas turbocharger according to claim 11, wherein the head of the at least one spacer pin abuts against at least one of the axial mating face of the turbine housing and the axial mating face of the compressor housing.

14. An exhaust gas turbocharger, comprising:
a compressor housing defining a first axial mating face and a turbine housing defining a second axial mating face facing towards the first axial mating face;
a plurality of recesses disposed on at least one of the first axial mating face of the compressor housing and the second axial mating face of the turbine housing; and
a plurality of spacer pins disposed between the compressor housing and the turbine housing interfacing with the plurality of recesses, the plurality of spacer pins composed of a heat-insulating material and respectively including a head and at least one axial pin extending from the head, wherein the head of at least one spacer pin axially decouples the turbine housing from the compressor housing;
wherein the at least one axial pin of the plurality of spacer pins respectively engages into the plurality of recesses thereby connecting the compressor housing to the turbine housing.

15. The exhaust gas turbocharger according to claim 14, wherein at least some of the plurality of recesses are disposed on the first axial mating face of the compressor housing and at least some other of the plurality of recesses are disposed on the second axial mating face of the turbine housing.

16. The exhaust gas turbocharger according to claim 14, wherein at least one of the plurality of recesses is shaped as a fitted bore and fixes the at least one axial pin of at least one of the plurality of spacer pins.

17. The exhaust gas turbocharger according to claim 14, wherein at least one of the plurality of recesses is shaped as an elongated hole and receives the at least one axial pin of at least one of the plurality of spacer pins.

18. The exhaust gas turbocharger according to claim 14, wherein the plurality of spacer pins are composed of a ceramic material.

19. An exhaust gas turbocharger, comprising:
a compressor housing;
a turbine housing;
a plurality of spacer pins connecting the compressor housing to the turbine housing, the plurality of spacer pins composed of a heat-insulating material and respectively including a head and at least one axial pin;
a plurality of recesses disposed in at least one of the turbine housing and the compressor housing for receiving the plurality of spacer pins, the plurality of recesses including a first recess disposed in the turbine housing and a second recess disposed in the compressor housing;
wherein at least one spacer pin includes at least two axial pins, a first axial pin extending from the head in a direction of the turbine housing and a second axial pin extending from the head in a direction of the compressor housing, wherein the first axial pin and the second axial pin of the at least one spacer pin engage into the first recess disposed in the turbine housing and the second recess disposed in the compressor housing, respectively.

20. The exhaust gas turbocharger according to claim 19, wherein a second spacer pin of the plurality of spacer pins engages in one of the plurality of recesses via the at least one axial pin only in one of the turbine housing and the compressor housing.

\* \* \* \* \*